United States Patent
Mills

(10) Patent No.: US 9,497,518 B2
(45) Date of Patent: Nov. 15, 2016

(54) SYSTEM, APPARATUS AND METHOD FOR SUPPORTING MULTIPLE-INTERFACES FOR OPTICAL FIBER COMMUNICATION

(71) Applicant: SANDVINE INCORPORATED ULC, Waterloo (CA)

(72) Inventor: Jason Alexander Mills, Kitchener (CA)

(73) Assignee: SANDVINE INCORPORATED ULC, Waterloo, Ontario (CA)

( * ) Notice: Subject to any disclaimer, the term of this patent is extended or adjusted under 35 U.S.C. 154(b) by 66 days.

(21) Appl. No.: 14/538,157

(22) Filed: Nov. 11, 2014

(65) Prior Publication Data
US 2016/0134951 A1    May 12, 2016

(51) Int. Cl.
*H04B 10/40* (2013.01)
*H04Q 11/00* (2006.01)

(52) U.S. Cl.
CPC .......... *H04Q 11/0003* (2013.01); *H04B 10/40* (2013.01); *H04Q 2011/0007* (2013.01); *H04Q 2011/0037* (2013.01)

(58) Field of Classification Search
None
See application file for complete search history.

(56) References Cited

U.S. PATENT DOCUMENTS

| | | | | |
|---|---|---|---|---|
| 7,093,172 B2* | 8/2006 | Fan | ......................... | H04L 1/241 370/249 |
| 2014/0241369 A1* | 8/2014 | Ghiasi | ................. | H04L 49/9057 370/394 |
| 2016/0007102 A1* | 1/2016 | Raza | .................. | H04Q 11/0062 398/45 |

OTHER PUBLICATIONS

Matharu, Harpiner S., "100G Dual Gearbox: Improving Port Density on Line Cards in Core Network Equipment", White Paper: Virtex-7 HT FPGAs, pp. 1-10, Xilinx Inc., California, United States of America, Mar. 1, 2012.

* cited by examiner

*Primary Examiner* — Darren E Wolf
(74) *Attorney, Agent, or Firm* — Gowling WLG (Canada) LLP; Neil Henderson

(57) ABSTRACT

A multiple-interface apparatus, and networking device including: a plurality of system side lanes configured to connect to an electrical signal source; and a plurality of line side lanes, wherein the number of the plurality of line side lanes matches the number of the plurality of system side lanes, including: a first set of line side lanes configured to connect to a first optical transceiver module; and a second set of line side lanes configured to connect to a second optical transceiver module; a mode selector module configured to transmit the electrical signal to the first optical transceiver module on the first set of line side lanes or the second optical transceiver module on the second set of line side lanes; and an adaptation module to adapt the electrical signal for at least one of the first or second set of line side lanes.

18 Claims, 8 Drawing Sheets

SYSTEM, APPARATUS AND METHOD FOR SUPPORTING MULTIPLE-INTERFACES FOR OPTICAL FIBER COMMUNICATION

FIELD

The present disclosure relates generally to optical fiber communication systems. More particularly, the present disclosure relates to a system, apparatus and method of supporting multiple-interfaces for optical fiber communication.

BACKGROUND

Optical fibers are used in communications systems to transmit information over networks by sending pulses of light through the optical fiber. Optical fibers are generally used to allow transmission over longer distances and at higher data rates than traditional metal-wire cables. Optical fibers may also have less loss and have greater immunity to electromagnetic interference than metal-wire cables.

Optical fiber communication systems typically include an optical transceiver module which connects to an electrical signal source module, sometimes referred to as a network integrated circuit (IC), and converts an electrical signal (i.e. a non-optical signal) from the network IC into an optical signal for communication over an optical fiber and vice versa. Optical transceiver modules are generally made and configured in accordance with various standards and thus there are different types of optical transceiver module depending on the standard in question. These optical transceiver modules generally vary based on characteristics such as the number of lanes, the data rate at which each lane transmits, or the like. Here, 'lane' generally refers to a receive/transmit pair of electrical differential pair signals. A 'port' refers to a group of lanes that function together to form a single logical connection point.

The data rate for each lane of an electrical signal source module or optical transceiver module is typically standards based and the data rates are typically: 10 Gigabit Ethernet ("10GE")(See IEEE standard 802.3ae), 40 Gigabit Ethernet ("40GE") (See IEEE standard 802.3ba), and 100 Gigabit Ethernet ("100GE") (See IEEE standard 802.3ba). In some cases, the data rate for each lane of the electrical signal source may be as per the OTN (Optical Transport Networking) standard. The OTN standard is a replacement for the SONET/SDN standard. OTN typically has: ITU OTL4.4 which is four lanes of 27.95 Gbps (comparable to 100GE), ITU OTL3.4 which is four lanes of 11.18 Gbps (comparable to 40GE), and/or ITU OTL2.1 which is one lane of 11.18 Gbps (comparable to 10GE). It will be understood that other standards and data rates may also be available or become available in the future.

Because of changing standards, differences in data rates on different equipment, the need for interoperability, and the like, there is a need for an improved system, apparatus and method of supporting multiple-interfaces for the various electrical signal source modules and optical transceiver modules that are available in the marketplace.

SUMMARY

It is an object of the present disclosure to obviate or mitigate at least one disadvantage of previous systems, apparatuses and methods.

In a first aspect, there is provided a multiple-interface apparatus including: a plurality of system side lanes configured to connect to an electrical signal source; and a plurality of line side lanes, wherein the number of the plurality of line side lanes matches the number of the plurality of system side lanes, including: a first set of line side lanes configured to connect to a first optical transceiver module; and a second set of line side lanes configured to connect to a second optical transceiver module; a mode selector module that can be set to transmit the electrical signal to the first optical transceiver module on the first set of line side lanes or the second optical transceiver module on the second set of line side lanes; and an adaptation module to adapt the electrical signal for at least one of the first set of line side lanes or the second set of line side lanes.

In one case, the plurality of line side lanes may further include at least one additional set of line side lines connected to at least one additional optical transceiver module.

In another case, the multiple-interface apparatus transmits the electrical signal to the first optical transceiver module when lanes at the optical transceiver module operate at an equivalent per lane data rate as the electrical signal source.

In another case, the multiple-interface apparatus transmits the electrical signal to the second optical transceiver module when lanes at the optical transceiver module operate at a different per lane data rate than the electrical signal source and the multiple-interface apparatus adapts the electrical signal accordingly.

In yet another case, adapting the electrical signal is selected from the group consisting of converting, re-clocking, or bit multiplexing.

In another aspect, there is provided a networking device configured to support multiple-interfaces for optical fiber communication, the networking device including: a multiple-interface apparatus configurable to output an electrical signal to a plurality of line side lanes; an electrical signal source configured to supply an electrical signal to the multiple-interface apparatus; and a plurality of ports each connected to a set of the line side lanes, wherein each of the ports is connectable to an optical transceiver module; wherein the multiple-interface apparatus is selectable to operate in a first mode or a second mode, in the first mode the multiple-interface apparatus passes-through the electrical signal for supply to a first optical transceiver module via at least one of the line side lanes on at least one of the line side ports, and in the second mode the multiple-interface apparatus adapts the electrical signal for supply to a second optical transceiver module via at least one of the line side lanes on at least one of the other line side ports.

In one case, the first optical transceiver module operates at a first standard data rate per lane and the second optical transceiver module operates at a second standard data rate per lane.

In another case, at least one of the optical transceiver modules is included in both the first group and second group.

In yet another case, the first optical transceiver module is selected from a group consisting of Quad Small Form-factor Pluggable ("QSFP"), Enhanced small form-factor pluggable ("SFP+"), and CFP4.

In yet another case, the second optical transceiver modules is selected from a group consisting of CFP4, CFP2, and Quad Small Form-factor Pluggable 28 ("QSFP28").

In yet another case, the electrical signal source is configured to only supply an electrical signal to a subset of the plurality of system side lanes.

In a further aspect, a method for supporting multiple-interfaces for optical fiber communication, the method including: selecting a mode of operation of a multiple-interface apparatus from a pass-through mode or an adaptation mode; and if the pass-through mode is selected:

supplying an electrical signal to a system side lane of the multiple-interface apparatus; passing the electrical signal through the multiple-interface apparatus; and supplying the electrical signal to at least one optical transceiver module at a line side lane of the multiple-interface apparatus; if the adaptation mode is selected: supplying an electrical signal to a system side lane of the multiple-interface apparatus; adapting the electrical signal in the multiple-interface apparatus; and supplying the adapted electrical signal to at least one optical transceiver module at a line side lane of the multiple-interface apparatus.

In one case, configuring the electrical signal source to only supply an electrical signal to a subset of system side lanes of the multiple-interface apparatus.

In another case, adapting the electrical signal is selected from the group consisting of converting, re-clocking, or bit multiplexing.

In yet another case, in the pass-through mode, the electrical signal is supplied to the at least one optical transceiver module at an equivalent per lane standard data rate as the electrical signal source.

In a further case, the standard per lane data rate of the electrical signal supplied to the at least one optical transceiver module is 10 Gigabits-per-second (Gbps).

In yet another case, in the adaptation mode, the electrical signal is supplied to the at least one optical transceiver module at a different per lane standard data rate than the electrical signal source.

In a further case, the standard per lane data rate of the electrical signal supplied to the at least one optical transceiver module is 25 Gbps.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a system, network device, apparatus and method of supporting multiple-interfaces for communications systems. More particularly, there is provided a multiple-interface apparatus for connecting a first type of optical transceiver module and one or more other types of optical transceiver modules having differing characteristics to an electrical signal source without reconfiguring the system, network device or the like.

Figure 1:
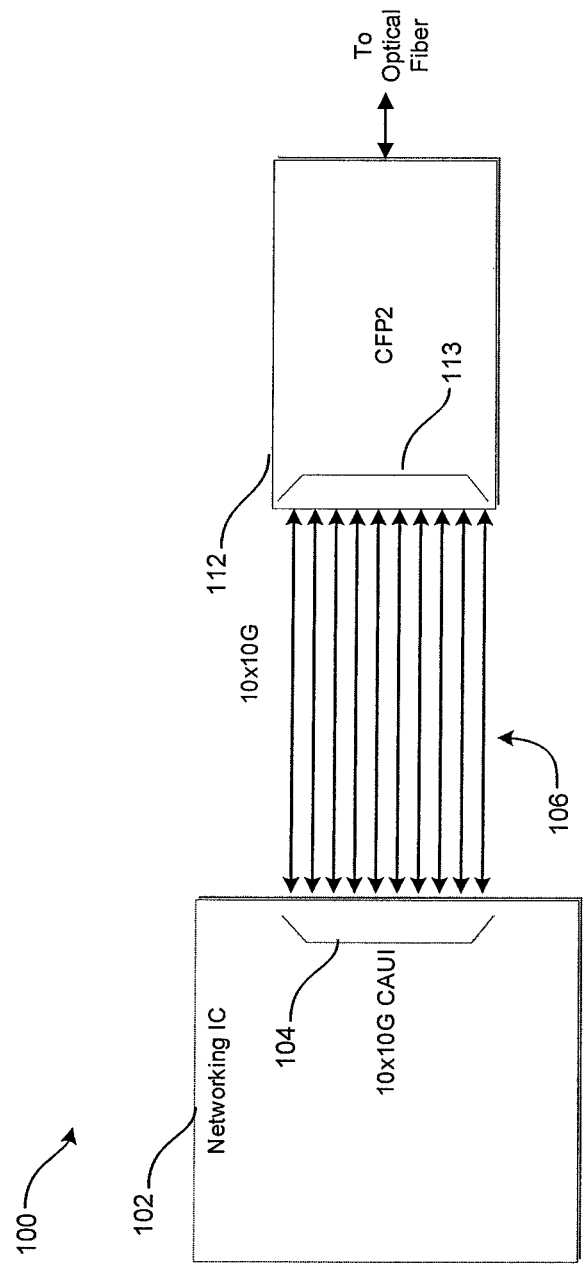
FIG. 1 is an example of a conventional electrical to optical connection showing the network IC and the optical transceiver.

FIG. 1 shows a conventional electrical signal to optical signal connection system 100 in which an electrical signal source module 102, sometimes called a networking integrated circuit (IC), includes a port 104 having a plurality of lanes 106 and an optical transceiver module 112 includes a port 113 that is configured to connect with the port 104 (and plurality of lanes 106) of the electrical signal source 102. The ports 104 and 113 are generally bi-directional ports in that signals can be both received and transmitted.

Generally speaking, the networking IC 102 provides the electrical signals to be converted into an optical signal for communication over the optical fiber. However, it will be understood that any appropriate electrical signal source module 102 that provides suitable electrical signals may be used. In the present disclosure, the terms networking IC and electrical signal source module may be referred to interchangeably.

Some typical electrical signal sources 102 may have a "CAUI" port, which has 10 lanes, whereby each lane has a 10 Gbps data rate, as defined in IEEE standard 802.3 Annex 83A. Other typical electrical signal sources 102 may have a "SFI" or "XFI" port, which has 1 lane, whereby the lane has a 10 Gbps data rate, as defined in SFF-8431 (SFI) and INF-8077i (XFI). Yet other typical electrical signal sources 102 may have a "XLAUI" port, which has 4 lanes, whereby each lane has a 10 Gbps data rate, as defined in IEEE standard 802.3 Annex 83A.

The optical transceiver module 112 is generally chosen to match with the electrical signal source 102 such that the ports and number of lanes can work together to transmit and receive data. Types of optical transceiver modules 112 may include:

Enhanced small form-factor pluggable ("SFP+") which is a 10GE optical transceiver module;

Quad Small Form-factor Pluggable ("QSFP") which is a 40GE optical transceiver module. QSFP has four lanes, each lane having a 10 Gigabits-per-second ("Gbps") data rate;

Quad Small Form-factor Pluggable 28 ("QSFP28") which is a 100GE optical transceiver module. QSFP28 has four lanes, each lane having a 25 Gbps data rate;

CFP2 which is a 100GE optical transceiver module. CFP2 may have ten lanes, each lane having a 10 Gbps data rate. In some cases, the CFP2 may have four lanes, each lane having a 25 Gbps data rate; and CFP4 which is a 100GE optical transceiver module. CFP4 has four lanes, each lane having a 25 Gbps data rate. In some cases, a CFP4 optical transceiver module may have four lanes at 10 Gbps data rate each.

Because of the various types of ports (and data rates) available on both electrical signal source modules and optical transceiver modules, adaptation of the electrical signal can be useful when interfacing one type of electrical signal source module 102 with another type of optical transceiver module 112. This may be necessary, for example, when the lanes of the electrical signal source module 102 have a different data rate or port structure (i.e. number of lanes, shape, or the like) than the required input of the optical transceiver module 112 or vice versa. Adaptation between the electrical signal source and the optical transceiver module can be accomplished with an adaptation apparatus that may be placed between the electrical signal source module 102 and the optical transceiver. This type of adaptation apparatus is sometimes referred to as a "gearbox". An adaptation apparatus may, for example, implement the Physical Medium Attachment (PMA) bit-multiplexing function described in IEEE standard 802.3 Clause 83, section 83.5.2. An adaptation apparatus typically only converts from one data rate/port structure to another data rate/port structure. For example from a 10 lane×10GE port on an electrical signal source module 102 to a 4 lane×25GE port on an optical transceiver module 112.

Figure 2:
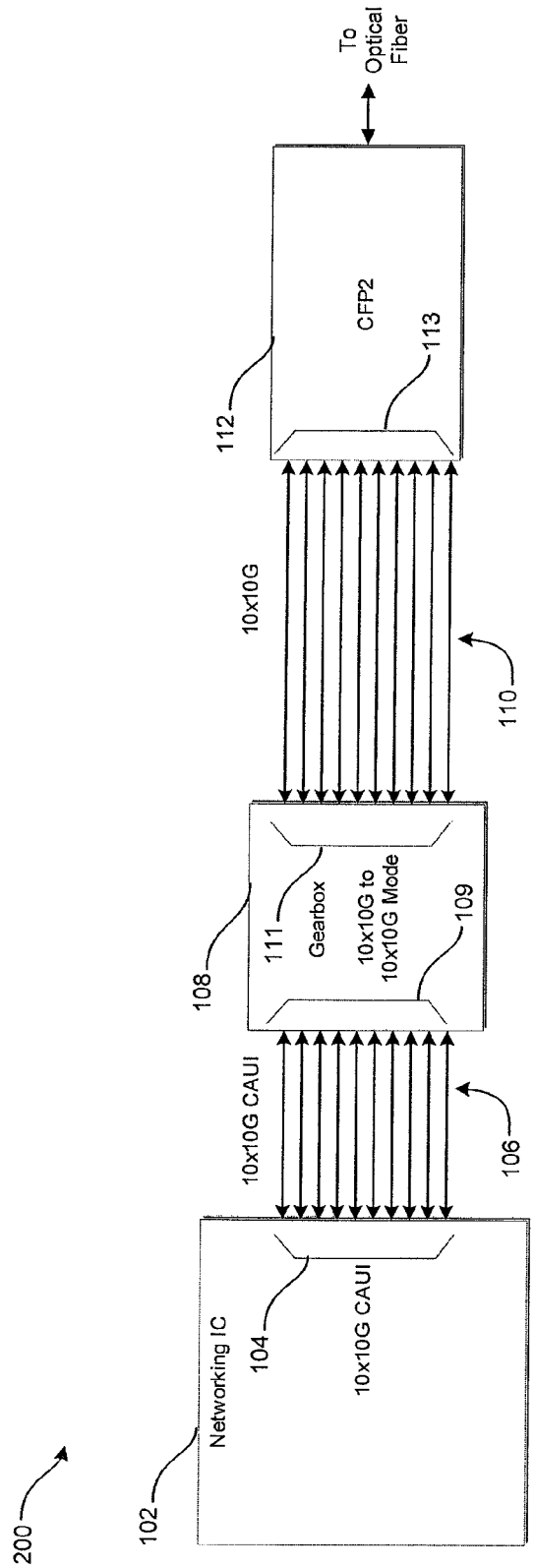
FIG. 2 is a block diagram of an embodiment of an electrical to optical connection including a gearbox configured to interface with a CFP2 optical transceiver module.

FIG. 2 is a block diagram of an embodiment of an electrical signal to optical fiber connection 200 including an adaptation apparatus 108. The connection includes an electrical signal source 102, an adaptation apparatus 108 and an optical transceiver module 112. The adaptation apparatus 108 includes a system side port 109 containing system side lines 106 and a line side port 111 containing line side lanes 110. The system side lanes 106 of the adaptation apparatus 108 are connected to a port 104 of the electrical signal source 102. The line side lanes 110 of the adaptation apparatus 108 are connected to the port 113 of the optical transceiver module 112.

In this embodiment, the adaptation apparatus 108 is configured to interface two different types of optical transceivers having different data rates/port structures. In FIG. 2, the adaptation apparatus 108 is configured to connect a 10×10GE electrical signal source 102 with a CFP2 (10× 10GE) optical transceiver module 112. The adaptation apparatus 108 in this case is configured to pass-through the 10×10GE lanes from the electrical signal source 102 to the 10×10GE lanes of the CFP2 module 112.

Figure 3:
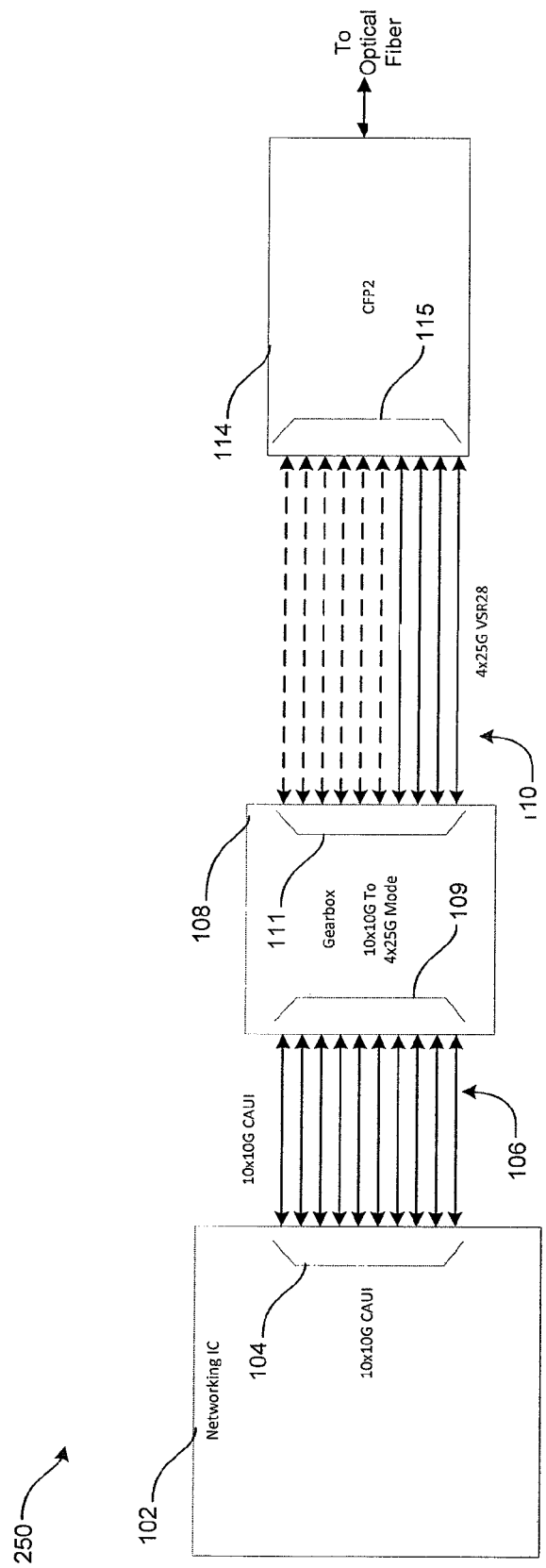
FIG. 3 is a block diagram of an embodiment of an electrical to optical connection including an adaptation apparatus in 10×10GE to 4×25GE mode.

FIG. 3 is a block diagram of an embodiment of an electrical signal to optical fiber connection 250 including an adaptation apparatus 108 in 10×10GE to 4×25GE mode. The connection includes an electrical signal source 102, an adaptation apparatus 108 and an optical transceiver module 114. In this case, the optical transceiver module 114 is a 4×25GE type of CFP2 module. The adaptation apparatus 108 includes a system side port 109 containing system side lines 106 and a line side port 111 containing line side lanes 110. The system side lanes 106 of the adaptation apparatus 108 are connected to a port 104 of the electrical signal source 102. The line side lanes 110 of the adaptation apparatus 108 are connected to the port 115 of the optical transceiver module 114.

In this embodiment, the adaptation apparatus 108 is configured to interface a 10×10GE electrical signal source 102 with a 4×25GE CFP2 optical transceiver module 114. The adaptation apparatus 108 adapts the 10×10GE lanes from the electrical signal source 102 to the 4×25GE lanes of the CFP2 module 114. It will be understood that adapting may include converting, re-clocking, bit multiplexing or the like of the 10 lanes of 10 Gbps (10×10 Gbps) signal from the electrical signal source 102 to 4 lanes of 25 Gbps (4×25 Gbps) 110 at the line side port 111 for reception by the CFP2 optical transceiver module 114. In this case, each of the adaptation apparatus 108 and the CFP2 optical transceiver module 114 have the same number of lines and similar form factor but the adaptation apparatus 108 adapts the electrical signals to only use the four active lanes of the CFP2 optical transceiver module 114.

Conventional CFP2 100GE optical transceiver modules may provide a simple way to upgrade because CFP2 transceivers can support multiple 10GE ports directly, without any additional manipulation of the signals. To transition from a module with 10 lanes of 10GE (10×10GE) to a single 100GE port, one may only need to install a different CFP2 module (provided the system and/or the electrical signal source supports both modes of operation) as noted above.

In contrast to CFP2 optical transceiver modules, CFP4 optical transceiver modules typically have a smaller form factor and require less power, and thus may be preferred by network users and administrators. However, CFP4 optical transceiver modules do not support 10GE operation in the same way as CFP2 optical transceiver modules. It is not conventionally technically feasible to build a CFP4 optical transceiver module that has 10×10GE due to the space and power constraints of the CFP4 form factor. Adding more 10GE ports to the system would most likely require adding additional networking ICs and thus incurring additional cost, space, power, or the like. In particular, it may be problematic to make a CFP4 optical transceiver module that can split up a 100GE port to 10×10GE ports because the power and space required to implement the required functionality may not fit within the requirements of the CFP4 standard.

Because of the various standards, some systems may address the issue by adding extra 10GE, 40GE or other ports. However, this is generally expensive and is typically difficult to implement because additional networking ICs would generally be required. Further, at 10 Gbps data rates and above, an extra repeater, buffer, Ethernet physical layer (PHY), or the like, is often required to clean up the signals before leaving the system. This may require additional physical space, power, and cost.

As networks progress from 10GE to 40GE and to 100GE, it is generally advantageous to be able to support multiple interface standards by using a multiple-interface apparatus to interface an electrical signal source with multiple different optical transceiver modules having differing characteristics, for example, have a different number of lanes, data rates, form factor or the like. For instance, this type of functionality may allow users to buy a piece of network equipment, use one or more 10GE ports until the rest of their network is upgraded, and then upgrade to 40GE or 100GE at a later time. For example, a typical electrical signal source module 102 may have a port with 10 lanes of 10 Gbps electrical signals. In contrast, a CFP4 optical transceiver module's electrical interface is typically 4 lanes of 25 Gbps signals while a QSFP optical transceiver module's electrical interface is typically 4 lanes of 10 Gbps signals. Further, the form factors for the CFP4 and QSFP are different than for a CFP2. Generally speaking, there is a need for a multiple-interface apparatus that can be provided to distribute the bits of data from all 10 Gbps lanes over a plurality of lanes depending on the type of interface required, using a standardized pattern so that a similar multiple-interface apparatus located at the other end of the optical fiber can recover the original 10 Gbps signals.

Thus, an aspect of the present disclosure is to provide a multiple-interface apparatus that provides the capability of multiple ports, such as for CFP4 at 100GE or QSFP at 10GE or 40GE, or SFP+ at 10GE without requiring additional networking ICs or having to change the architecture of the electrical signal delivery system, including the electrical signal source module. Depending on the configuration, all of the multiple ports may be used at the same time or may be used mutually exclusively.

Figure 4:
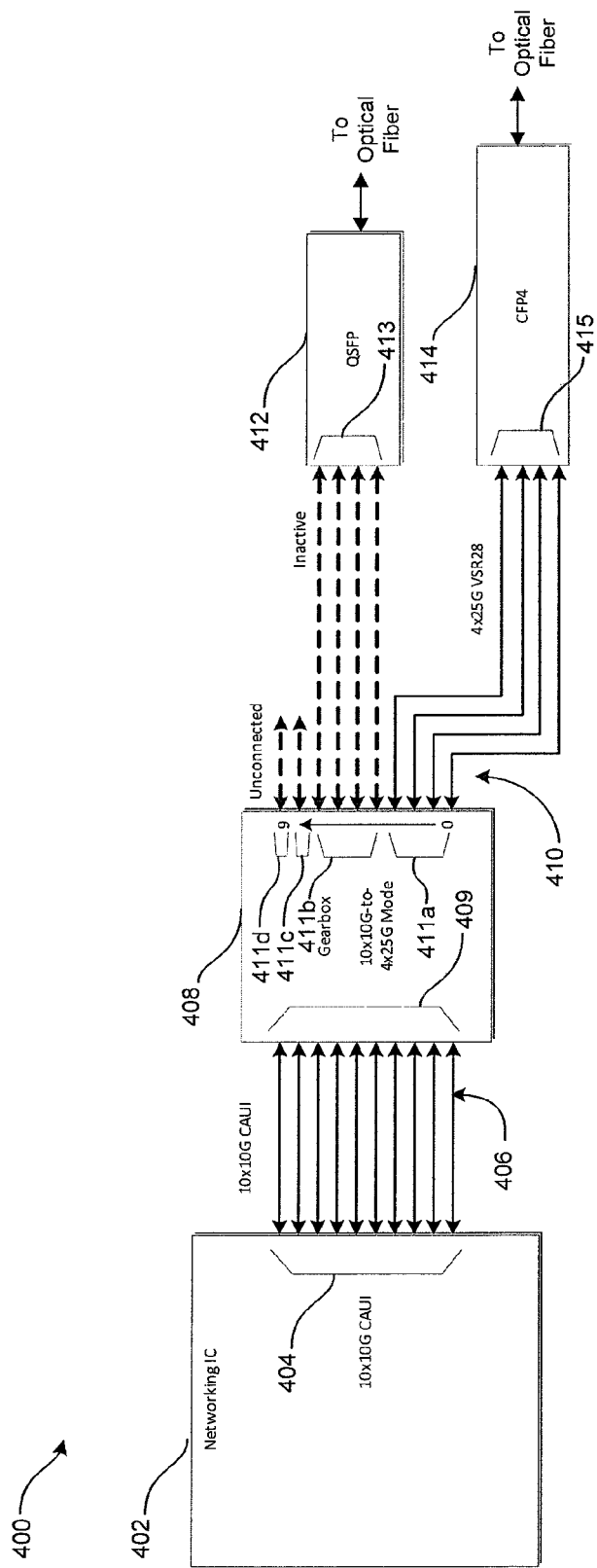
FIG. 4 is a block diagram of an embodiment of a system for supporting multiple-interfaces for optical fiber communication with a multiple-interface apparatus in a first mode.
Figure 5:
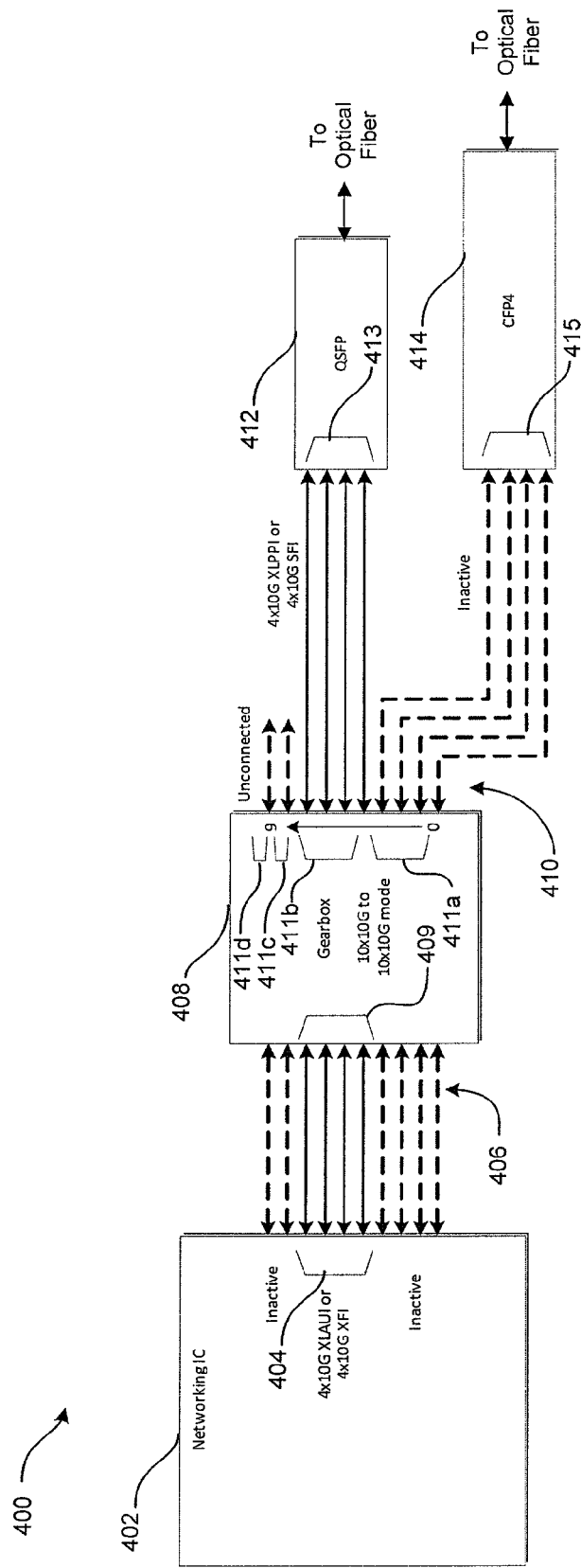
FIG. 5 is a block diagram of the embodiment of FIG. 4 with the multiple-interface apparatus in a second mode.

Turning to FIGS. 4 and 5, a block diagram of a system for optical fiber communication 400 is shown. The system 400 includes an electrical signal source module 402, a multiple-interface apparatus 408, and two optical transceiver modules 412, 414. In this case, there is a QSFP optical transceiver module 412 with a port 413 and a CFP4 optical transceiver module 414 with a port 415. The multiple-interface apparatus 408 is connected to the port 404 of the electrical signal source module 402 through a plurality of system side lanes 406 via a system side port 409. As well, the multiple-interface apparatus 408 is connected to the optical transceiver modules 412, 414 through at least one of the line side lanes 410 via one of the line side ports 411a, 411b, 411c and 411d (collectively, the line side ports 411).

In this embodiment, the electrical signal source module 402 includes 10 lanes that are each capable of 10 Gbps data rate operation. The system side port 409 of the multiple-interface apparatus 408 also includes 10 lanes that are each capable of 10 Gbps data rate operation.

The line side ports 411 of the multiple-interface apparatus 408 are connectable to the line side lanes 410, which, for convenience, can be numbered consecutively 0 through 9. In further cases, the line side ports 411 may be external to the multiple-interface apparatus 408, with the line side lanes 410 connecting the line side ports 411 to the multiple-interface apparatus 408.

In the example of FIGS. 4 and 5, the line side lanes 410 of the multiple-interface apparatus 408 include:
  4 lanes that are capable of 10 Gbps or 25 Gbps standard data rate operation. These lanes are numbered consecutively 0 through 3.
  6 lanes that are capable of 10 Gbps standard data rate operation. These lanes are numbered consecutively 4 through 9.

In further examples, the multiple-interface apparatus 408 may have various combinations of 10 Gbps and 25 Gbps lanes.

The electrical signal source module 402 may be configurable to allow its lanes to operate in different modes at run-time. For example, a group of 10 serializers/deserializers ("serdes") or lanes may be configurable as one of the following:
  a single CAUI port (10 lanes of 10 Gbps, making up a single 100GE port);
  ten SFI/XFI ports (10 lanes of 10 Gbps, but operating as 10 independent 10GE ports);
  two XLAUI ports (2 groups of 4 lanes of 10 Gbps, operating as 2 independent 40GE ports); or
  some combination of XLAUI and SFI/XFI ports.

In some cases, the electrical signal source module 402 may be able to put its serdes into 10GE and 40GE modes, which may require that some of the lanes be inactive.

A multiple-interface apparatus 408, according to embodiments described herein, has the intended advantage of being able to, operate in various modes to accommodate the various settings available. For example, having the option to operate in modes with:
  adaptation of a 10×10 Gbps data rate to a 4×25 Gbps data rate; or
  pass-through of a 10×10 Gbps data rate to a 10×10 Gbps data rate.

The pass-through mode is generally intended to pass along the 10 Gbps data streams coming from the electrical signal source module 402 without re-arrangement or adaptation. The data passes-through the multiple-interface apparatus 408 unchanged. This mode of operation may be used in one of the following example arrangements:
  connection to a CFP2 optical transceiver module—some CFP2 modules have a 10×10 Gbps data rate interface (as opposed to others that have a 4×25 Gbps electrical interface);
  retiming ten 10 Gbps lanes going to ten independent SFP+ modules (10GE ports);
  retiming one or two groups of 4×10 Gbps lanes going to one or two QSFP modules (40GE ports);
  retiming some combination of 10GE or 40GE ports;
  or the like.

Note that QSFP modules are available that treat the 4 lanes of 10 Gbps signals as independent 10GE ports. For the purposes of this disclosure, a single QSFP operating in this mode can generally be considered the same as four separate SFP+ modules.

As the multiple-interface apparatus 408 is provided in order to perform both adaptations of the electrical signal, such as from 10×10GE to 4×25GE, as well as a pass-through mode, the multiple-interface apparatus 408 can support CFP2 optical transceiver modules that do either 10×10 Gbps or 4×25 Gbps. Conventional CFP4 optical transceiver module implementations may involve an adaptation apparatus that only supports 4×25GE, As such, the multiple-interface apparatus 408 may be considered a "CFP2 gearbox" which is used with CFP4 in order to gain the extra ports.

According to an embodiment, a multiple-interface apparatus 408 can operate in a mode with 4 lanes of 25 Gbps data rate (4×25GE) or in a mode with 10 lanes of 10 Gbps data rate (10×10GE). As illustrated in the example of FIGS. 4 and 5, the first four lanes, designated 0-3, of the multiple-interface apparatus 408 may be connected to a 25GE per lane optical transceiver module, in this case the CFP4 optical transceiver module 414. At least some of the other 6 lanes, designated 4-9, may be connected to a 10GE per lane optical transceiver module, in this case a QSFP optical transceiver module 412.

In the example of FIG. 4, when the port 404 of the electrical signal source module 402 is to run in 100GE mode, the multiple-interface apparatus 408 is set to 4×25GE mode (referred to as "adaptation mode") and lanes 0-3 on line side port 411a connect to the CFP4 module 414 which is used to transmit and receive signals along an optical fiber. It will be understood that the 25GE per lane optical transceiver module does not need to be restricted to lanes 0-3 but may alternatively be connected to other lanes of the multiple-interface apparatus 408, depending on the configuration of the apparatus 408. In adaptation mode, the multiple-interface apparatus 408 adapts the electrical signal received from the electrical signal source module 402 to a format that can be used by an optical transceiver module that does not run at the same per lane data rate as the electrical signal source module. In this case, the multiple-interface apparatus 408 adapts the 10×10GE signal to 4×25GE. In adaptation mode, the 10×10 Gbps lanes on the electrical signal source module 402 are configured as a single 100GE CAUI port 404. The multiple-interface apparatus 408 is then configured to convert 10×10 Gbps received on the system side port 409 to 4×25 Gbps to be communicated on the line-side ports 411. The CFP4 module 414 is active as a single 100GE port and connected to lanes 0-3. In this mode, the QSFPs and/or SFP+ modules 412 connected to line side port 411b on the line side lanes 4-7 are inactive. Unconnected lanes 8 and 9 on line side ports 411c and 411d, respectively, are also inactive.

As shown in FIG. 5, when the port of the electrical signal source module 402 is to run in 10GE or 40GE mode, the multiple-interface apparatus 408 is set to 10×10GE mode (sometimes referred to as "pass-through mode") and an optical transceiver module 412 connected to at least some of lanes 4-9 are used to transmit and receive signals along an optical fiber. In particular, in pass-through mode, the port 404 of the electrical signal source module 402 is configured as 10×10 Gbps lanes consisting of a combination of XLAUI 40GE ports and/or SFI/XFI 10GE ports. The multiple-interface apparatus 408 is then configured to pass through the 10 Gbps lanes on the system side port 409 to 10 Gbps lanes communicated on the line side ports 411. The QSFPs and/or SFP+ modules 412 connected to line side port 411b on line side lanes 4-7 are active. In this example, the optical transceiver module connected to lanes 4-7 is a QSFP module 412. It will also be understood that the 10GE per lane optical transceiver module(s) may be connected to other lanes of the multiple-interface apparatus 408 depending on configuration. In other cases, the lanes connected to the CFP4 optical transceiver module 414 could be either separately or concurrently used in the pass-through mode if a CFP4 module 414 that supports 10 Gbps per lane is used. The CFP4 module 414 connected to port 411a on line-side lanes 0-3 may be active if the multiple-interface apparatus 408 is communicating with the line side lanes at 4×10 Gbps. The CFP4 optical transceiver module 414 may be required to support either four independent 10GE ports, or a single 40GE port in order to function in this mode. For example, a QSFP module in a CFP4 form factor.

Figure 6:
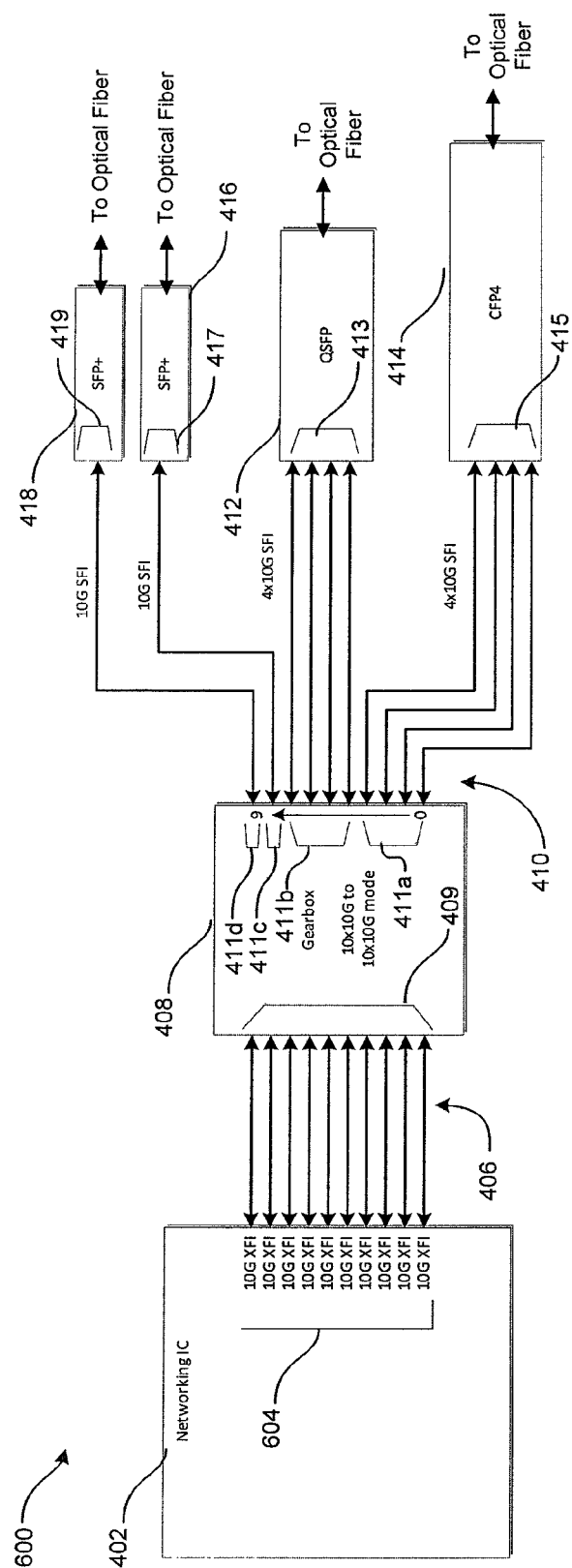
FIG. 6 is a block diagram of the embodiment of FIG. 4 with the multiple-interface apparatus in a further arrangement.

Turning to FIG. 6, a block diagram of an embodiment of a system for supporting multiple-interfaces for optical fiber communication 600 is shown. Similar to FIGS. 5 and 6, the system 600 includes an electrical signal source module 402, a multiple-interface apparatus 408 and multiple optical transceiver modules 412, 414, 416, 418. In this case, there is a QSFP optical transceiver module 412 having a port 413, a CFP4 optical transceiver module 414 having a port 415, and a first SFP+ optical transceiver module 416 having a port 417 and a second SFP+ optical transceiver module 418 having a port 419. A system side port 409 of the multiple-interface apparatus 408 is connected to a port 604 of the electrical signal source module 402 through a plurality of system side lanes 406. Line side ports 411a, 411b, 411c and 411d (collectively the line side ports 411) of the multiple-interface apparatus 408 are connected to the optical transceiver modules 412, 414, 416, 418 through a plurality of line side lanes 410 numbered 0 to 9.

In FIG. 6, the multiple-interface apparatus 408 is operating in pass-through mode while the lanes of the electrical signal source module 402 are run in 10×10GE mode. This configuration allows each of the ten 10 Gbps line side lanes to be ultimately routed to an optical transceiver module. In the example of FIG. 6, this includes connecting a CFP4 (4×10GE) optical transceiver module 414 to line side port 411a on lanes 0-3, a QSFP optical transceiver module 412 to line side port 411b on lanes 4-7, a first SFP+ optical transceiver module 416 to line side port 411c on lane 8 and a second SFP+ optical transceiver module 418 to line side port 411d on lane 9. In other cases, the QSFP optical transceiver module 412 could be replaced by four SFP+ optical transceiver modules. In some cases, all 10 lanes may be concurrently active, and in other cases, only some of the lanes may be active at the same time.

Figure 7:
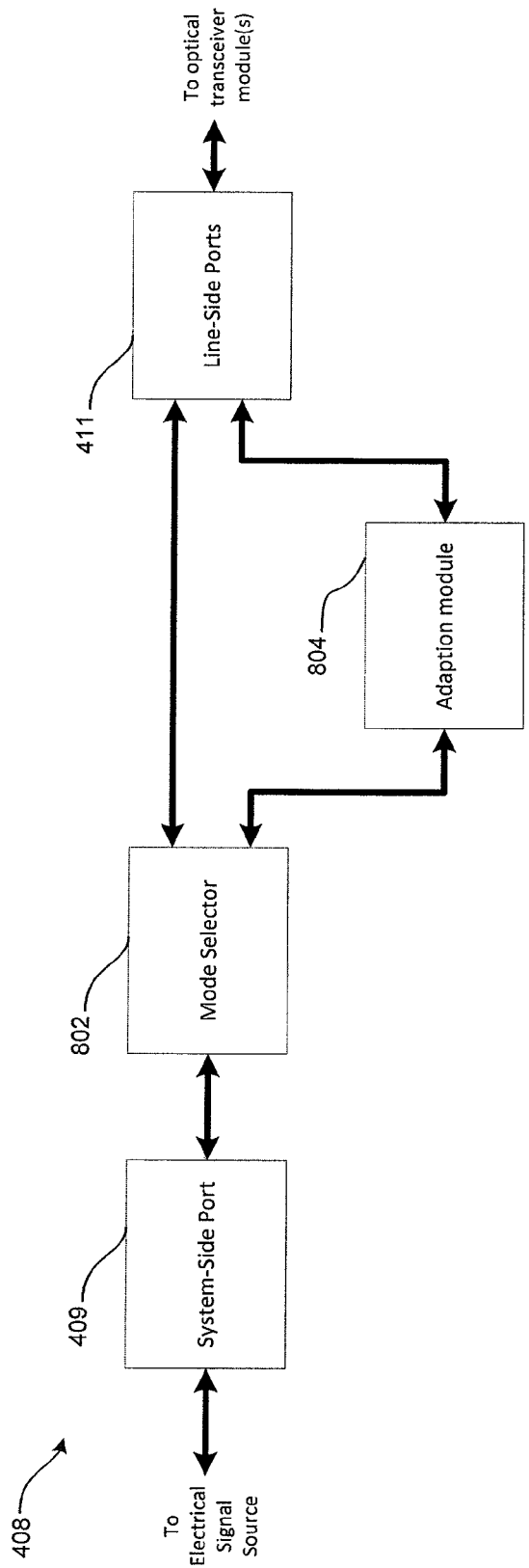
FIG. 7 is a block diagram showing an embodiment of a multiple-interface apparatus.

FIG. 7 illustrates an exemplary block diagram for a multiple-interface apparatus 408, according to an embodiment herein. The multiple-interface apparatus 408 includes a system-side port 409 connected to an electrical signal source module 402 and line-side ports 411 connected to one or more optical transceiver modules 412, 414, 416, 418. The multiple-interface apparatus 408 further includes a module selector 802 and an adaptation module 804. In one particular example, the mode selector 802 selects between a 10×10GE-to-10×10GE mode (pass-through mode) and a 10×10GE-to-4×25GE mode (adaptation mode). The modes may be selected automatically or manually. Each line on the diagram represents between 1 and 10 lanes.

When the mode selector 802 is in 10×10GE-to-10×10GE mode, the mode selector 802 passes the signal through the 10 Gbps lanes from the system-side port 409 to the line-side ports 411. In this mode, the adaptation module 804 is bypassed. When the mode selector 802 is in 10×10GE-to-4×25GE mode, the mode selector 802 passes the signal through the adaptation module 804. The adaptation module 804 adapts, converts, re-clocks, and/or bit multiplexes the signal. The adaptation module 804 is connected to the line-side ports 411 and provides the adapted signal to the mode selector 802 and the line-side ports 411.

In some cases, depending on the system configuration, the mode selector 802 may only pass through a portion of the lanes to the line-side ports 411 or to the adaptation module 804, thus leaving the remaining lanes inactive.

Figure 8:
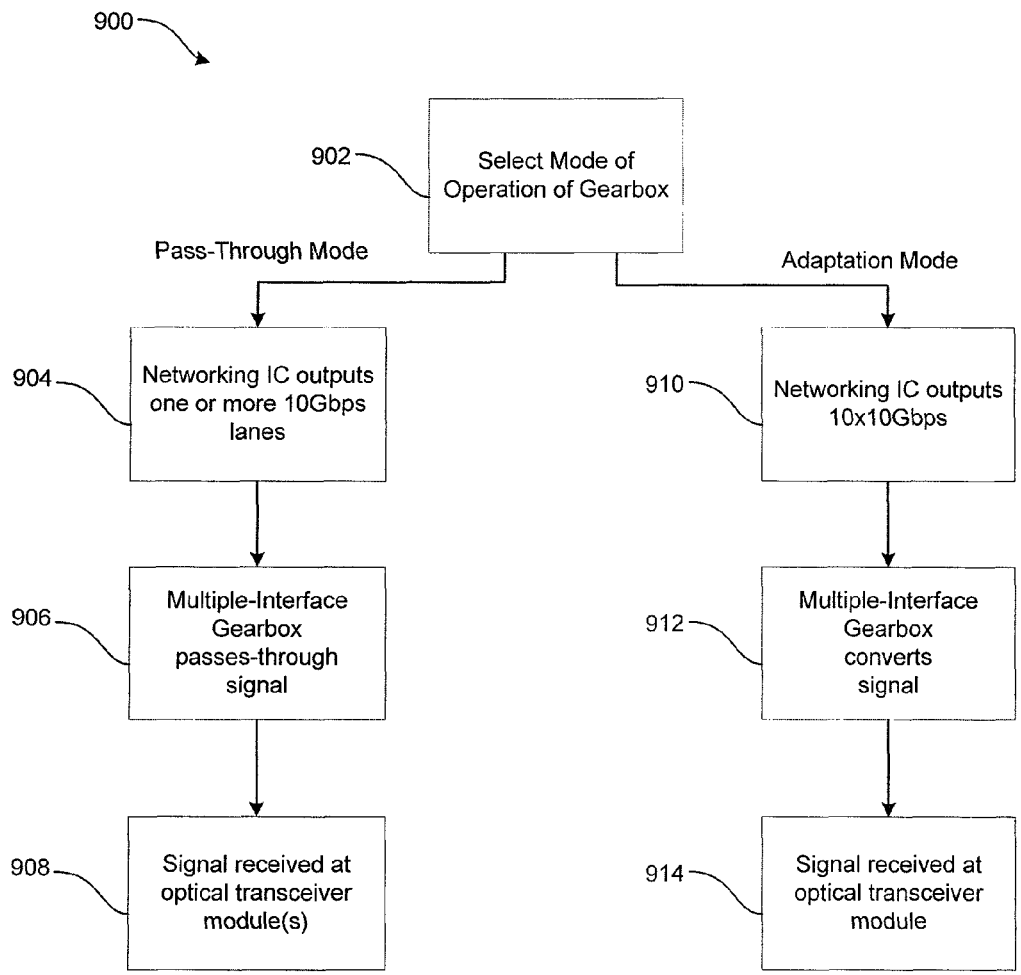
FIG. 8 is a block diagram of an embodiment of a method for supporting multiple-interfaces for optical fiber communication with a multiple-interface apparatus.

FIG. 8 illustrates a method of supporting multiple-interfaces for optical fiber communication 900. The method of FIG. 8 allows connection of one or more optical transceiver modules, at a first standard per lane data rate, and one or more optical transceiver modules, at a second standard per lane data rate, to a single port on an electrical signal source using a multiple-interface apparatus.

At 902, a mode of operation of the multiple-interface gearbox is selected based on the nature of the data being transmitted. The mode of operation can either be a pass-through mode or an adaptation mode.

If a pass-through mode of operation is chosen, at 904, the electrical signal source produces a signal at a first standard data rate (e.g. 10GE) electrical signal on the system side lanes of the multiple-interface apparatus. The amount of lanes that receive the signal is chosen to be equivalent to the amount of line side lines that are connected to an optical transceiver module having the same first standard data rate. In the example of FIG. 5, four lanes at 10GE each (4×10GE) receive the electrical signal.

At 906, the multiple-interface apparatus passes-through the signal from the electrical signal source to one or more optical transceiver modules located on the line side. At 908, the signal is received at the one or more optical transceiver modules. In this mode, the optical transceiver modules receiving the signal may be, for example, one or more QSFP modules, one or more SFP+ modules, a combination of both, or the like. In this mode, in some cases, the lanes which are not connected to the electrical signal lanes on the line side are selected to be not active.

If an adaptation mode of operation is selected, at 910, the electrical signal source produces a signal on a first number of lanes at a first standard data rate (e.g. ten lanes at 10 Gbps each (10×10 Gbps)). At 912, the multiple-interface apparatus converts, re-clocks, and/or bit multiplexes the signal from the electrical signal source to a second number of lanes at a second standard data rate (for example, four lanes at 25 Gbps each (4×25 Gbps)). The second number of lanes are connected to one or more optical transceiver modules located on the line side. At 914, the signal is received at the one or more optical transceiver modules. In this mode, the optical transceiver modules receiving the signal may be, for example, a CFP4 module, a QSFP28 module, or the like. In this mode, the lanes which are not a part of the second lanes on the line side are not active.

It is an intended advantage of embodiments of the apparatus, system and method of the present disclosure to provide a multiple-interface apparatus that can interface with two or more different optical transceiver modules without having to remove, replace, or change the optical transceiver modules or the apparatus. A multiple-interface apparatus may thus have added flexibility and capabilities over conventional systems. In some cases, it is intended that using a multiple-interface apparatus can reduce the form factor of the system by, for example, allowing the optical transceiver modules to more easily connect to the network side equipment. In one particular case, the multiple-interface apparatus may be designed such that ports for different optical transceiver modules may be placed on different sides of a circuit board such that multiple types of optical transceiver modules may be connected at the same time and the appropriate optical transceiver module is active depending on the mode of the multiple-interface apparatus.

It is a further intended advantage that the multiple-interface apparatus, as described herein, can provide for easier migration between standards. In an example, a system can migrate from 10GE to 40GE to 100GE without requiring substantial hardware replacement. In some cases, only the optical transceiver modules are required to be replaced as the system migrates to other standards. This flexibility may substantially reduce costs and ease transitions between or among standards.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein or components thereof are implemented as a software routine, hardware circuit, firmware, or a combination thereof.

Embodiments of the disclosure or components thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Adaptations, modifications and variations can be effected to the particular embodiments by those of skill in the art. The scope of the claims should not be limited by the particular embodiments set forth herein, but should be construed in a manner consistent with the specification as a whole.

What is claimed is:

1. A multiple-interface apparatus comprising:
   a system side port comprising a plurality of system side lanes configured to connect to an electrical signal source and receive an electrical signal; and
   a line side port comprising a plurality of line side lanes, wherein the number of the plurality of line side lanes matches the number of the plurality of system side lanes, comprising:
      a first set of line side lanes configured to connect to a first optical transceiver module; and
      a second set of line side lanes configured to connect to a second optical transceiver module;
   a mode selector module that receives the electrical signal from the system side port and is configured to select a mode of operation from either a pass-through mode or an adaptation mode based on data being transmitted by the electrical signal such that the electrical signal is sent to the first optical transceiver module on the first set of line side lanes or the second optical transceiver module on the second set of line side lanes based on the selected mode; and
   an adaptation module, which, when adaptation mode is selected, receives the electrical signal from the mode selector module and is configured to adapt the electrical signal, to form an adapted electrical signal, for at least one of the first set of line side lanes or the second set of line side lanes, and supply the adapted electrical signal to the first or second optical transceiver module via the line side port.

2. The multiple-interface apparatus of claim 1, wherein the plurality of line side lanes further comprises at least one additional set of line side lines connected to at least one additional optical transceiver module.

3. The multiple-interface apparatus of claim 1, wherein the multiple-interface apparatus transmits the electrical signal to the first optical transceiver module when lanes at the optical transceiver module operate at an equivalent per lane data rate as the electrical signal source.

4. The multiple-interface apparatus of claim 1, wherein the multiple-interface apparatus transmits the electrical signal to the second optical transceiver module when lanes at the optical transceiver module operate at a different per lane data rate than the electrical signal source and the multiple-interface apparatus adapts the electrical signal accordingly.

5. The multiple-interface apparatus of claim 4, wherein adapting the electrical signal is selected from the group consisting of converting, re-clocking, or bit multiplexing.

6. A networking device configured to support multiple-interfaces for optical fiber communication, the networking device comprising:
   an electrical signal source configured to supply an electrical signal;
   a multiple-interface apparatus comprising a system side port to receive the electrical signal and a plurality of line side lanes;
   a plurality of line side ports each connected to a set of the plurality of line side lanes, wherein each of the line side ports is connectable to an optical transceiver module,
   wherein the multiple-interface apparatus is selectable to operate in a pass-through mode or an adaptation mode, wherein mode selection is based on data being transmitted by the electrical signal, and, when in the pass-through mode, the multiple-interface apparatus passes-through the electrical signal for supply to a first optical transceiver module via at least one of the line side lanes on at least one of the line side ports, and, when in the adaptation mode the multiple-interface apparatus adapts the electrical signal, to form an adapted electrical signal, for supply to a second optical transceiver module via at least another of the line side lanes on at least another of the line side ports.

7. The networking device of claim 6, wherein the first optical transceiver module operates at a first data rate per lane and the second optical transceiver module operates at a second data rate per lane.

8. The networking device of claim 7, wherein at least one of the first and second optical transceiver modules operates at both the first data rate per lane and the second data rate per lane.

9. The networking device of claim 7, wherein the optical transceiver module operating at the first data rate per line is selected from a group consisting of Quad Small Form-factor Pluggable ("QSFP"), Enhanced small form-factor pluggable ("SFP+"), and CFP4.

10. The networking device of claim 7, wherein the optical transceiver module operating at the second data rate per lane is selected from a group consisting of CFP4, CFP2, and Quad Small Form-factor Pluggable 28 ("QSFP28").

11. The networking device of claim 6, wherein the electrical signal source is configured to only supply an electrical signal to a subset of the plurality of system side lanes.

12. A method for supporting multiple-interfaces for optical fiber communication, the method comprising:
  receiving an electrical signal from an electrical signal source;
  selecting a mode of operation of a multiple-interface apparatus via a mode selection module from either a pass-through mode or an adaptation mode, wherein the mode of operation is selected based on data being transmitted by the electrical signal; and
  when the pass-through mode is selected:
    supplying the electrical signal, from the electrical signal source, to a system side lane of the multiple-interface apparatus, via a system side port;
    passing the electrical signal through the multiple-interface apparatus; and
    supplying the electrical signal to at least one optical transceiver module at a line side lane of the multiple-interface apparatus, via a line side port;
  when the adaptation mode is selected:
    supplying the electrical signal, from the electrical signal source, to the system side lane of the multiple-interface apparatus;
    passing the electrical signal through the multi-interface module via an adaptation module;
    adapting the electrical signal in the adaption module to form an adapted electrical signal; and
    supplying the adapted electrical signal to at least one optical transceiver module at a line side lane of the multiple-interface apparatus, via the line side port.

13. The method of claim 12, further comprising configuring the electrical signal source to only supply an electrical signal to a subset of system side lanes of the multiple-interface apparatus.

14. The method of claim 12, wherein adapting the electrical signal is selected from the group consisting of converting, re-clocking, or bit multiplexing.

15. The method of claim 12, wherein in the pass-through mode, the electrical signal is supplied to the at least one optical transceiver module at an equivalent per lane data rate as the electrical signal source.

16. The method of claim 15, wherein the per lane data rate of the electrical signal supplied to the at least one optical transceiver module is 10 Gigabits-per-second (Gbps).

17. The method of claim 12, wherein in the adaptation mode, the electrical signal is supplied to the at least one optical transceiver module at a different per lane data rate than the electrical signal source.

18. The method of claim 17, wherein the per lane data rate of the electrical signal supplied to the at least one optical transceiver module is 25 Gbps.

* * * * *